United States Patent [19]

Seike et al.

[11] Patent Number: 4,459,275

[45] Date of Patent: Jul. 10, 1984

[54] PROCESS FOR PRODUCTION OF SULFUR FROM SO$_2$-CONTAINING GAS

[75] Inventors: Yasuhiko Seike, Odawara; Takeshi Tomita, Hiratsuka, both of Japan

[73] Assignee: Sumitomo Heavy Industries, Ltd., Tokyo, Japan

[21] Appl. No.: 391,791

[22] Filed: Jun. 23, 1982

[30] Foreign Application Priority Data

Jul. 1, 1981 [JP] Japan ............................... 56-102451
Aug. 28, 1981 [JP] Japan ............................... 56-134099

[51] Int. Cl.$^3$ ............................................. C01B 17/02
[52] U.S. Cl. ................................. 423/569; 423/567 R; 423/570; 423/573 G; 423/574 R; 422/110; 422/111
[58] Field of Search ........... 423/574 R, 574 L, 573 R, 423/573 G, 570, 576.6, 567, 569; 422/110, 111

[56] References Cited

U.S. PATENT DOCUMENTS

| Re. 28,864 | 6/1976 | Andral | 423/573 R |
| 3,933,992 | 1/1976 | Andral | 423/573 G |
| 4,341,753 | 7/1982 | Mori et al. | 423/569 |

FOREIGN PATENT DOCUMENTS 55-154308 12/1980 Japan ............................... 423/244

*Primary Examiner*—Gregory A. Heller

*Attorney, Agent, or Firm*—Flynn, Thiel, Boutell & Tanis

[57] ABSTRACT

A process for production of sulfur from SO$_2$-containing gas is disclosed comprising the steps of contacting said SO$_2$-containing gas mixed with additional oxygen or air, with carbonaceous materials, in a SO$_2$ reduction reactor under elevated temperatures to thereby produce a first gaseous mixture containing vaporous sulfur, H$_2$S, COS and unreacted SO$_2$; separating said vaporous sulfur by condensation from the first gaseous mixture to thereby obtain a second gaseous mixture; introducing the second gaseous mixture into a Claus reactor to thereby obtain a third gaseous mixture containing a vaporous sulfur produced by Claus reaction; separating said vaporous sulfur by condensation from the third gaseous mixture to thereby obtain a fourth gaseous mixture of reduced sulfur compound content; and recovering the sulfur separated from said first and third gaseous mixtures, the improvement comprising regulating the amount of oxygen or air mixed with the SO$_2$-containing gas feed so that (a) the SO$_2$ conversion in said SO$_2$ reduction reactor may be controlled at a predetermined value in the range of 75–85% or (b) the SO$_2$ concentration of said fourth gaseous mixture may be controlled at a predetermined value, whereby the molar ratio of H$_2$S/SO$_2$ or (H$_2$S+COS)/SO$_2$ of said second gaseous mixture is maintained at a level of about 2.

10 Claims, 5 Drawing Figures

PROCESS FOR PRODUCTION OF SULFUR FROM SO₂-CONTAINING GAS

BACKGROUND OF THE INVENTION

The present invention relates to a process for production of sulfur from $SO_2$-containing gas in which a $SO_2$ reduction reaction using coal, coke or the like and a Claus reaction of $H_2S$ and COS with unreacted $SO_2$ generated during said $SO_2$ reduction reaction are utilized.

As a process for production of an elemental sulfur from $SO_2$-containing gas from the activated carbon regenerator or the like of a dry desulfurization plant, there has been known a process for producing sulfur using carbonaceous particles of coal, coke or the like as a reducing agent, at a temperature of 621°–843° C. by a reaction such as $SO_2 + C \rightarrow S + CO_2$. However, this process is defective in that, due to the co-existence of steam in $SO_2$-containing gas, side reactions such as a water gas reaction and the like unavoidably take place in the process of reduction of $SO_2$ to thereby produce $H_2S$, COS and the like, whereby a high sulfur productivity can not be achieved. In view of this, public attention has recently been attracted to a process using a $SO_2$ reduction reactor and a Claus reactor in series, said process comprising, producing sulfur through said reduction reaction in the reduction reactor of the first stage, supplying $H_2S$, COS and unreacted $SO_2$ by-produced in the process of this $SO_2$ reduction reaction to the Claus reactor of the second stage, and further producing sulfur through Claus reaction: $2H_2S + SO_2 \rightarrow 3S + 2H_2O$.

The most serious problem with the process for recovery of sulfur using the $SO_2$ reduction reactor in series and Claus reactor maintaining the molar ratio of $H_2S/SO_2$ of the gas supplied to the Claus reactor of the second stage at a value optimum to the Claus reaction. Generally speaking, there is a tendency that the $SO_2$ and $H_2S$ concentrations in the gas coming from the $SO_2$ reduction reactor depend upon the amount of oxygen (air) supplied additionally to the $SO_2$-containing gas, namely when the amount of oxygen (air) increases, the $SO_2$ concentration lowers and inversely the $H_2S$ concentration rises. Therefore, it is theoretically possible to maintain the molar ratio of $H_2S/SO_2$ of the gas supplied to the Claus reactor at a value optimum to the Claus reaction by regulating the above mentioned amount of oxygen (air). However, there exists an extremely important problem of what should be selected as a controlled variable for regulating the amount of oxygen (air) supplied.

Japanese Laid Open Patent Application 167107/1980 teaches that the amount of air supplied should be controlled so that the $SO_2$ reduction temperature may be controlled at a temperature of 850°–950° C. on the basis of the discovery that the molar ratio of $H_2S/SO_2$ of gas coming from the $SO_2$ reduction reactor can be maintained by carefully controlling the reaction temperature in the $SO_2$ reduction reactor, concretely by reducing $SO_2$ at a temperature of 850°–950° C. In other words, this process selects the reaction temperature in the $SO_2$ reduction reactor as the controlled variable for regulating the amount of air supplied. However, it is not necessarily commendable to use the reaction temperature as the controlled variable. The reason is that since the temperature in the $SO_2$ reduction reactor is affected by the potential heat of preheated $SO_2$-containing gas, the combustion heat of carbonaceous particles, the heat of reaction in the reactor, radiant heat from the reactor and the like, a very complicated temperature distribution is formed in the $SO_2$ reduction reactor. In order to maintain a fixed reaction temperature, as a matter of course it is necessary to measure the temperature in the reactor. This temperature measurement involves the following problems. When the temperature in the reactor is measured by a thermometer directly installed in the reactor, the thermometer is corroded in short period of time by a high temperature atmosphere and so must be exchanged at relatively frequent intervals. This is very troublesome. On the other hand, when the temperature in the reactor is estimated by a thermometer installed in the side wall of the reactor, on the one hardly expected to obtain an estimated value of the reactor temperature with satisfactory accuracy. To sum up, the method taught by said laid open patent application comprising regulating the amount of air supplied so that the $SO_2$ reduction reaction may take place at a temperature of 850°–950° C. by monitoring the temperature in the reactor is not practical.

Y. Seike, one of the present inventors, has proposed, in U.S. patent application Ser. No. 317,382 filed Nov. 2, 1981, a process of regulating the amount of oxygen (air) to be supplied to the $SO_2$ reduction reactor which comprises directly measuring the concentrations of $H_2S$, $SO_2$ and if needed COS of the outlet gas of the Claus reactor and employing the measured values thereof as the controlled variables. The process of regulating the amount of oxygen (air) by employing the $H_2S$ concentration and $SO_2$ concentration of the outlet gas from the Claus reactor as the controlled variables is an improvement as compared with the process which employs the reaction temperature in the $SO_2$ reduction reactor as the controlled variable, but is still defective in that expensive measuring instruments and tools are required for measuring not only the $SO_2$ concentration but the $H_2S$ concentration.

In this situation, the present inventors have discovered that when the $SO_2$-containing gas is relatively stable in $SO_2$ concentration, for instance, the $SO_2$-containing gas comes from the regenerators of conventional dry desulfurization plants, and this gas is added with oxygen (air) and treated in the $SO_2$ reduction reactor and then a Claus reactor disposed on the downstream side thereof, the molar ratio of $H_2S/SO_2$ or $(H_2S + COS)/SO_2$ of the outlet gas of the $SO_2$ reduction reactor (these molar ratios are generically named the "Claus ratio" hereinafter) depends upon the $SO_2$ conversion rate in the $SO_2$ reduction reactor irrespective of the kinds of carbonaceous particles used in the $SO_2$ reduction reactor. When the conversion rate is in the range of 75–85% the Claus ratio of the outlet gas of the $SO_2$ reduction reactor becomes 2, and further the $SO_2$ conversion rate depends upon the amount of oxygen (air) introduced into the $SO_2$ reduction reactor. Still further, we have discovered that irrespective of the kinds of carbonaceous particles used in the $SO_2$ reduction reactor, the Claus ratio of the outlet gas of Claus reactor has a definite fixed relationship with the $SO_2$ concentration of the outlet gas of the Claus reactor which depends upon the amount of oxygen (air) introduced into the $SO_2$ reduction reactor similarly.

SUMMARY OF THE INVENTION

The present invention relates to the improvements in a process for production of sulfur from a $SO_2$-containing gas mixed with additional oxygen (air) by using a SO$_2$ reduction reactor and a Claus reactor disposed on the downstream side thereof, in particular an improved process designed to employ either (i) the SO$_2$ conversion rate in the SO$_2$ reduction reactor or (ii) the SO$_2$ concentration of the outlet gas of the Claus reactor as the controlled variable to thereby manipulate the amount of oxygen (air) to be additionally mixed with SO$_2$-containing gas for maintaining the Claus ratio of the inlet gas of the Claus reactor at a level of about 2.

Accordingly, the present invention provides a process for production of sulfur from SO$_2$-containing gas comprising the steps of (a) contacting said SO$_2$-containing gas mixed with additional oxygen or air, with carbonaceous particles, in an SO$_2$ reduction reactor under elevated temperatures to thereby produce a first gaseous mixture containing vaporous sulfur, H$_2$S, COS and unreacted SO$_2$; (b) separating said vaporous sulfur by condensation from the first gaseous mixture to thereby obtain a second gaseous mixture; (c) introducing the second gaseous mixture into a Claus reactor to thereby obtain a third gaseous mixture containing a vaporous sulfur; (d) separating said vaporous sulfur by condensation from the third gaseous mixture to thereby obtain a fourth gaseous mixture of reduced sulfur compound content; and (e) recovering the sulfur separated from said first and third gaseous mixtures, wherein the improvement is characterized by regulating the amount of oxygen or air mixed with the SO$_2$-containing gas so that (i) the SO$_2$ conversion rate in said SO$_2$ reduction reactor may be controlled at a predetermined value corresponding to a range of 75–85% or (ii) the SO$_2$ concentration of said fourth gaseous mixture may be controlled at a predetermined value corresponding to a Claus ratio of 2 of the outlet gas from the Claus reactor for maintaining the Claus ratio of said second gaseous mixture at a level of about 2.

DETAILED DESCRIPTION OF THE PREFERRED EMBODIMENTS OF THE INVENTION

Taking the case of a dry desulfurization plant using activated carbon as an adsorbent, a highly concentrated SO$_2$-containing gas can be obtained from a regeneration process of said adsorbent. As stated previously, when this SO$_2$-containing gas is mixed with additional oxygen (air) and brought into contact with carbonaceous particles at 800°–1000° C. in the SO$_2$ reduction reactor, the SO$_2$ is reduced into an elemental sulfur. However, since the SO$_2$-containing gas as mentioned above ordinarily contains steam, in the SO$_2$ reduction reactor there take place a water gas reaction and the like together with an SO$_2$ reduction reaction. Due to this, a gas can be obtained from the SO$_2$ reduction reactor which contains vaporous sulfur, H$_2$S, COS, unreacted SO$_2$ and the like in addition to N$_2$ and CO$_2$.

Figure 1:
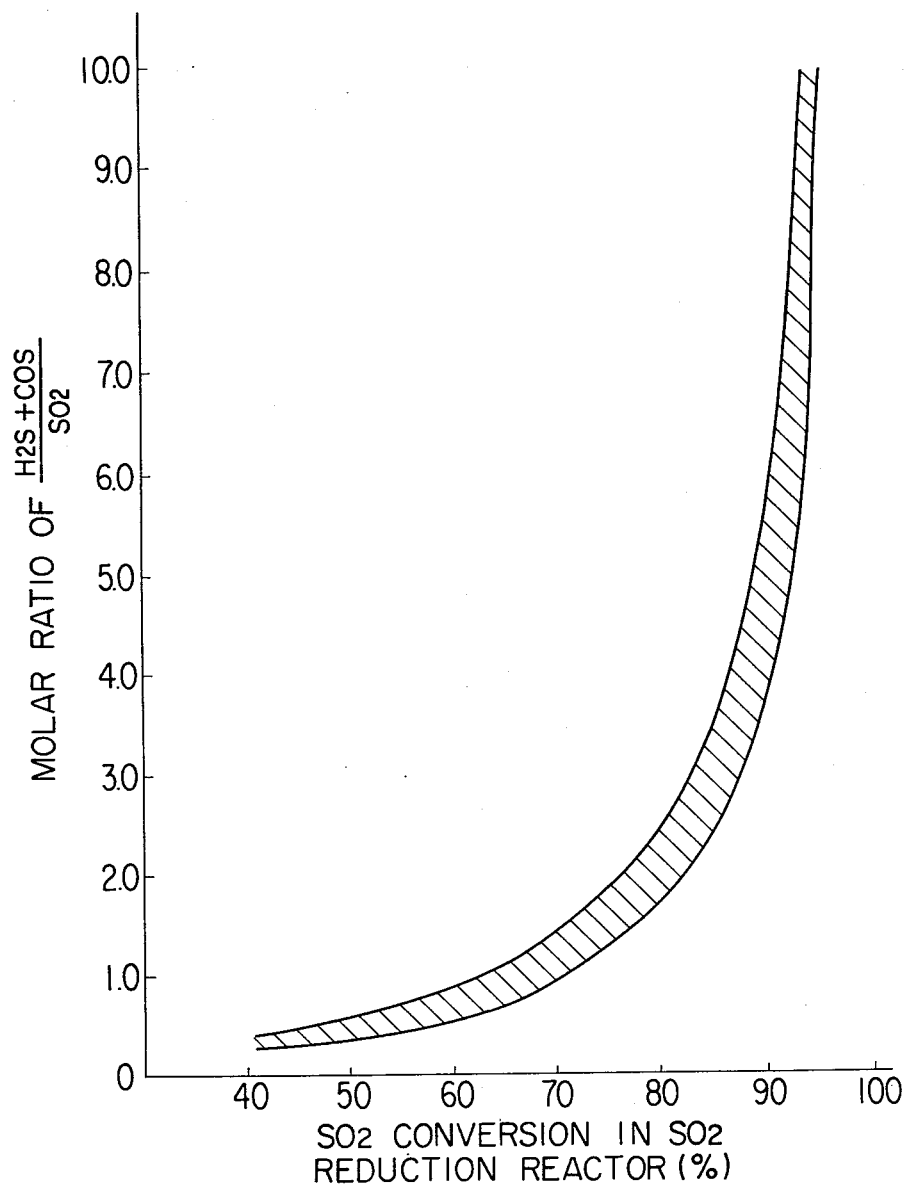
FIG. 1 is a graph showing the relationship between the SO$_2$ conversion rate in a SO$_2$ reduction reactor and the Claus ratio, that is, the molar ratio of (H$_2$S+COS)/SO$_2$, of an outlet gas of said reactor.

When an SO$_2$-containing gas mixed with additional oxygen (air) is supplied to a reactor packed with carbonaceous particles for reducing the SO$_2$ at elevated temperatures, according to our discovery there exists the relationship as shown in FIG. 1 between the Claus ratio of outlet gas of the SO$_2$ reduction reactor and the SO$_2$ conversion rate in said reactor.

That is, FIG. 1 is a graph showing the relationship between the SO$_2$ conversion rate and the Claus ratio of outlet gas of the SO$_2$ reduction reactor in the case of mixing the SO$_2$-containing gas from the regenerator of the dry desulfurization plant with additional air and treating the mixed gas at elevated temperatures in the SO$_2$ reduction reactors packed with different kinds of carbonaceous particles. As illustrated therein, it is observed that the Claus ratio increases exponentially with increase of the SO$_2$ conversion rate though it varies somewhat depending upon the kinds of carbonaceous particles used, and the Claus ratio of outlet gas of the reactor is always maintained at a value of about 2 so long as the SO$_2$ conversion rate is in the range of 75–85%, even if a different kind of carbonaceous particles is used. The outlet gas of the SO$_2$ reduction reactor is cooled for separating the vaporous sulfur contained therein by condensation, but said process does not exert any influence upon the Claus ratio of said gas. Because of this, it becomes possible to maintain the Claus ratio of inlet gas of the Claus reactor at a value preferable to the Claus reaction by regulating the amount of additional oxygen (air) to be mixed with the SO$_2$-containing gas so that the SO$_2$ conversion rate in the SO$_2$ reduction reactor may be controlled at a predetermined value in the range of 75–85% and the Claus ratio may be maintained at a SO$_2$ conversion value corresponding to 2.

One embodiment of the process according to the present invention comprises the steps of (a) contacting an SO$_2$-containing gas mixed with additional oxygen (air), with carbonaceous particles, in a SO$_2$ reduction reactor at elevated temperatures to thereby produce a first gaseous mixture containing vaporous sulfur, H$_2$S, COS and unreacted SO$_2$, (b) introducing said first gaseous mixture into a first condenser for separating said vaporous sulfur in situ by condensation to thereby obtain a second gaseous mixture containing H$_2$S, COS and unreacted SO$_2$, (c) introducing said second gaseous mixture into a Claus reactor to thereby produce a third gaseous mixture containing vaporous sulfur resulting from the Claus reaction, (d) introducing said third gaseous mixture into a second condenser for separating said vaporous sulfur in situ by condensation to thereby obtain a fourth gaseous mixture of reduced sulfur compound content, (e) regulating the amount of oxygen (air) mixed with the SO$_2$-containing gas so as to control the SO$_2$ conversion rate in the SO$_2$ reduction reactor at a predetermined value in the range of 75–85% and the Claus ratio of the second gaseous mixture at a level of about 2, and (f) recovering the elemental sulfur separated from the first and third gaseous mixtures.

According to this embodiment, the SO$_2$ rate in the SO$_2$ reduction reactor is monitored and the amount of air mixed with the SO$_2$-containing gas is regulated so that the SO$_2$ conversion rate may be controlled at a conversion rate corresponding to the Claus ratio of 2 in the range of 75–85%, but the amount of air required for controlling the $SO_2$ conversion rate uniformly within the above mentioned range varies somewhat according to the kind of carbonaceous particles used. However, once the kind of carbonaceous particles used in the $SO_2$ reduction reactor is decided, it becomes possible to control the $SO_2$ conversion rate at a predetermined value in the range of 75–85% by regulating the mixing ratio of air in the following ranges respectively, because there is a correlation between the $SO_2$ conversion rate and the amount of air mixed. Namely, the amount of air mixed is in the range of 0.35–0.55 $Nm^3/hr$ per $Nm^3/hr$ of the $SO_2$-containing gas when coke is used as the carbonaceous particles, is in the range of about 0.20–0.35 $Nm^3/hr$ when Natal coal is used, and is in the range of 0.35–0.40 $Nm^3/hr$ when Hongay coal is used.

Figure 2:
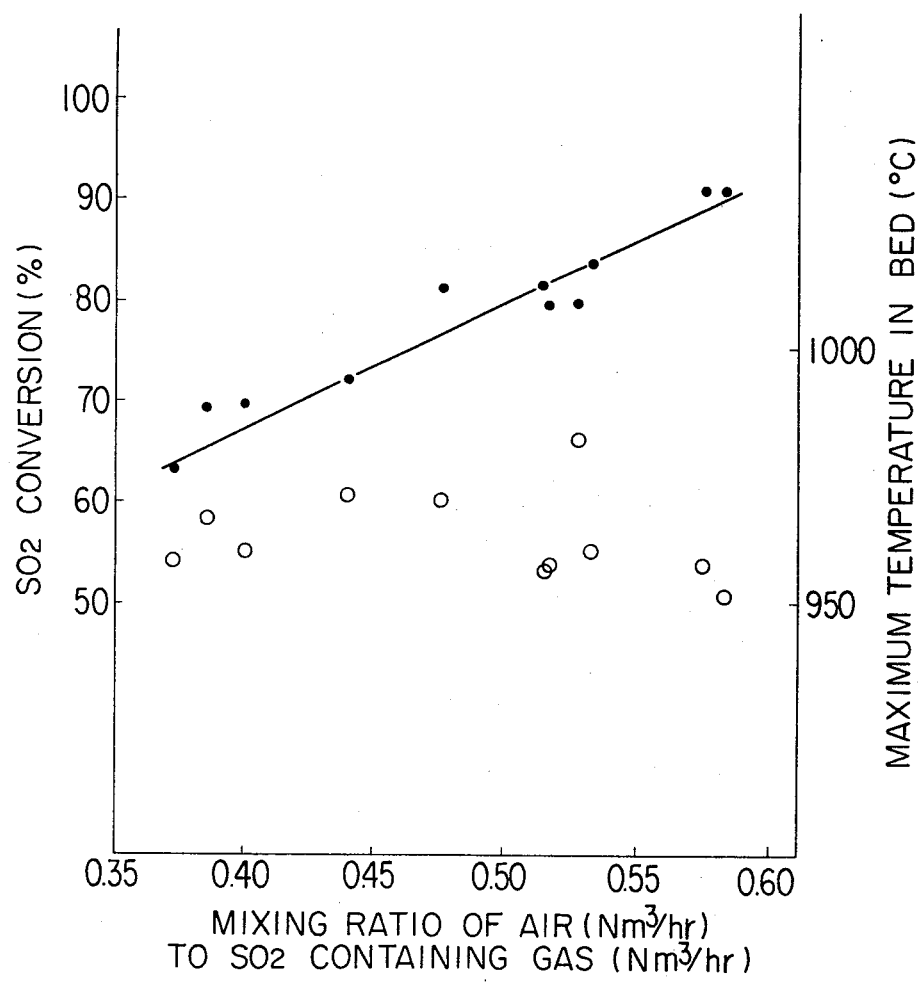
FIG. 2 is a graph showing the relationship between the mixing ratio of air with a SO$_2$-containing gas introduced into the SO$_2$ reduction reactor, the SO$_2$ conversion rate and the maximum reaction temperature in the SO$_2$ reduction reactor.

In this connection, FIG. 2 is a graph showing the relationship between the mixing ratio of air, the $SO_2$ conversion and the maximum reaction temperature in the $SO_2$ reduction reactor in the case of treating an $SO_2$-containing gas in an $SO_2$ reduction reactor using coke for iron manufacture as carbonaceous particles. As illustrated therein, the $SO_2$ conversion rate increases linearly as the mixing ratio of air increases. Accordingly, the $SO_2$ conversion rate is controlled in the range of 75–85% when the mixing ratio of air is about 0.46–0.54 $Nm^3/hr$ per $Nm^3/hr$ of the $SO_2$-containing gas, and the Claus ratio becomes 2 when the $SO_2$ conversion rate is about 80% and the mixing ratio of air is about 0.51. On the other hand, the maximum temperature in the reactor varies irregularly within the range of about 950°–990° C. This fact implies that it is difficult to control the reaction temperature in the $SO_2$ reduction reactor by the mixing ratio of air, but the $SO_2$ conversion rate in the reactor can be controlled directly by the mixing ratio of air.

To sum up, if the mixing ratio of air per $Nm^3/hr$ of the $SO_2$-containing gas is regulated properly within the range of about 0.20–0.55 depending upon the kind of carbonaceous particles used, it is possible to control the $SO_2$ conversion rate at a predetermined value within the range of 75–85% and consequently to maintain the Claus ratio of the outlet gas of the $SO_2$ reduction reactor at a level of about 2.

Another embodiment of the process according to the present invention comprises the steps of (a) contacting a $SO_2$-containing gas mixed with additional oxygen (air) with carbonaceous particles in a $SO_2$ reduction reactor at elevated temperatures to thereby produce a first gaseous mixture containing vaporous sulfur, $H_2S$, COS and unreacted $SO_2$, (b) introducing said first gaseous mixture into a first condenser for separating said vaporous sulfur in situ by condensation to thereby produce a second gaseous mixture containing $H_2S$, COS and unreacted $SO_2$, (c) introducing said second gaseous mixture into a Claus reactor to thereby produce a third gaseous mixture containing a vaporous sulfur resulting from the Claus reaction, (d) introducing said third gaseous mixture into a second condenser for separating said vaporous sulfur in situ by condensation to thereby obtain a fourth gaseous mixture of reduced sulfur compound content, (e) regulating the amount of additional oxygen or air mixed with the $SO_2$-containing gas so that the $SO_2$ concentration in the fourth gaseous mixture may be controlled at a predetermined value to thereby maintain the Claus ratio of the second gaseous mixture at a level of about 2, and (f) recovering the elemental sulfur separated from the first and third gaseous mixtures.

Figure 3:
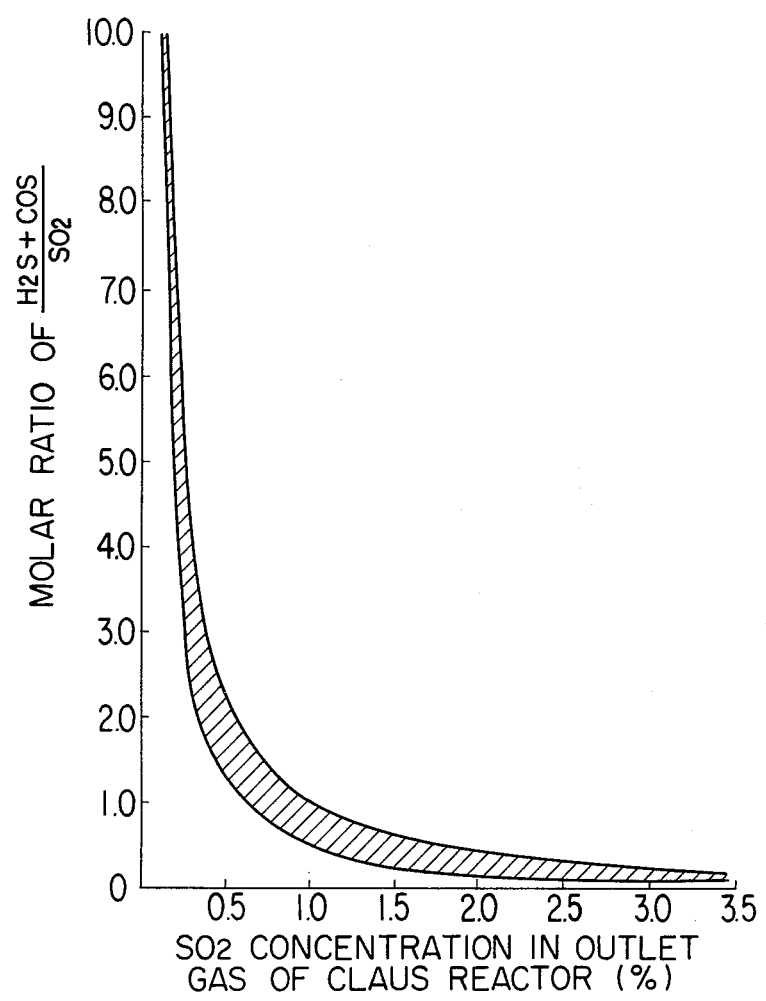
FIG. 3 is a graph showing the relationship between the SO$_2$ concentration of an outlet gas from a final Claus reactor and the Claus ratio, that is, the molar ratio of (H$_2$S+COS)/SO$_2$, of said outlet gas.

It is clear from our discovery that when oxygen (air) is mixed with a $SO_2$-containing gas which has a relatively stable $SO_2$ content, such as the gas obtained from a regenerator of activated carbon used in a dry desulfurization plant, and said mixture is treated in a $SO_2$ reduction reactor and then in a Claus reactor disposed on the downstream side thereof, there exists the relationship as shown in FIG. 3 between the Claus ratio of the outlet gas of the second Claus reactor and the concentration of $SO_2$ in said gas, irrespective of the kind of carbonaceous particles used in the $SO_2$ reduction reactor.

That is, FIG. 3 is a graph showing the relationship between the Claus ratio of outlet gas of a second Claus reactor and the $SO_2$ concentration thereof when the $SO_2$-containing gas coming from the regenerator of the dry desulfurization plant was treated in an $SO_2$ reduction reactor and then the outlet gas of said reactor was introduced into a first Claus reactor and then into a second Claus reactor, said Claus reactors being arranged in series on the downstream side of said $SO_2$ reduction reactor, various kinds of carbonaceous particles being usable in the $SO_2$ reduction reactor. As illustrated therein, between the Claus ratio of said outlet gas and the $SO_2$ concentration thereof there exists a definite correlation, which is somewhat variable depending upon the kind of carbonaceous particles used. Taking the illustrated case, the Claus ratio of said outlet gas is maintained in the range of $2\pm0.5$ so long as the $SO_2$ concentration of said outlet gas is controlled at a value of about 0.4%, whereby sulfur can be obtained with maximum yield efficiency. Although the above example is concerned with the case of employing two Claus reactors, whether one Claus reactor is employed or three or more of Claus reactors are employed in series, the relationship between the Claus ratio of said outlet gas and the $SO_2$ concentration thereof is still the same as that in the case of two Claus reactors with the exception that the $SO_2$ concentration which corresponds to a Claus ratio of 2 in said outlet gas varies depending upon the number of Claus reactors used.

In the case of the Claus reaction, as stated previously, if the Claus ratio of inlet gas to a Claus reactor is 2 the Claus ratio of outlet gas therein is also 2. On the other hand, if the Claus ratio of said inlet gas deviates from 2 the discrepancy is amplified in the outlet gas. Accordingly, the Claus ratio of inlet gas in the Claus reactor can be maintained at a value preferable to the Claus reaction by estimating the $SO_2$ concentration of outlet gas from a final Claus reactor which corresponds to a Claus ratio of 2 and regulating the amount of oxygen (air) mixed with an $SO_2$-containing gas by using said $SO_2$ concentration as the controlled variable.

As the typical $SO_2$-containing gas used in the present invention there is enumerated the gas obtained from the activated carbon regenerator of a dry desulfurization plant. This $SO_2$-containing gas is mixed with oxygen or air, generally with air. In the $SO_2$ reduction reactor there are packed carbonaceous particles such as coal, coke or the like normally in the form of a moving bed. The $SO_2$-containing gas is arranged to contact this moving bed countercurrently. The temperature of the moving bed, though it varies according to the amount of air mixed with the $SO_2$-containing gas feed, must be over 800° C. to ensure the reduction of $SO_2$ into an elemental sulfur. However, the temperature of the moving bed is required to be less than 1000° C. because, if it is too high, it tends to burn down carbonaceous particles excessively. The present invention can use one or more of Claus reactors. The Claus reactor used in the present invention is packed with a Claus catalyst such as alumina, titania or the like normally in the form of a fixed bed. The Claus reactor is generally maintained at a temperature in the range of 200°–350° C. which permits each Claus reactor to conduct an optimum Claus reaction in accordance with the number of Claus reactors used in series.

Figure 4:
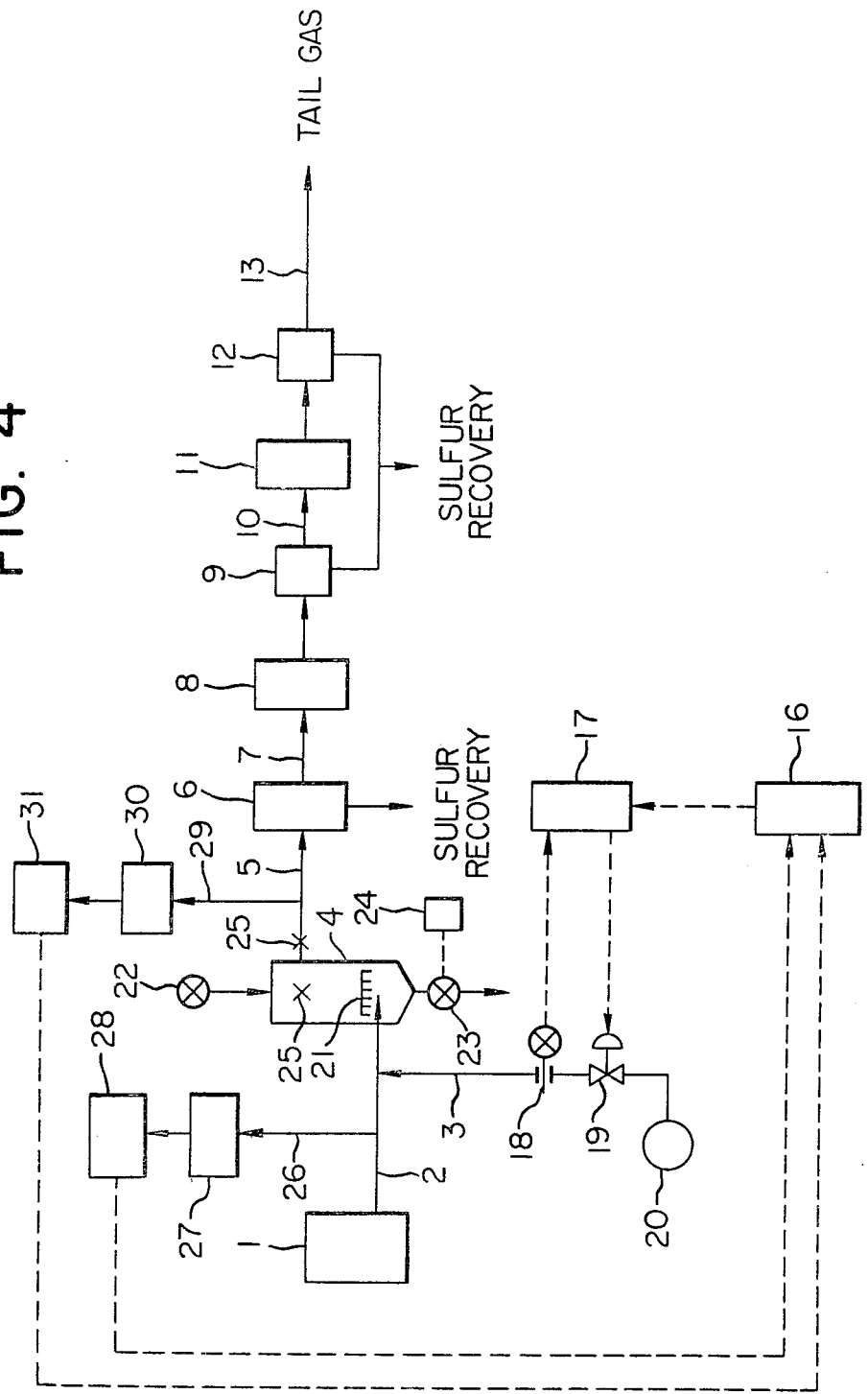
FIG. 4 and FIG. 5 are respective flow sheets showing embodiments of the present invention.

The process of the present invention will be explained with reference to FIG. 4. The $SO_2$-containing gas coming from a $SO_2$-containing gas generating source 1, for instance the activated carbon regenerator of a dry exhaust gas desulfurization plant, passes through a line 2, is mixed with air (oxygen) from a line 3 and is introduced into a moving bed type $SO_2$ reduction reactor 4, and is dispersed uniformly in the reactor by means of a distributor 21. In the $SO_2$ reduction reactor 4, the $SO_2$-containing gas mixed with oxygen contacts a moving bed of carbonaceous particles such as coal, coke or the like in a countercurrent manner by the operation of coal supply apparatus 22 and coal transport/discharge apparatus 23.

In the $SO_2$ reduction reactor 4, a part of the carbonaceous particles is burnt by the action of oxygen to create a reaction temperature and thus $SO_2$ is reduced into a vaporous sulfur in accordance with the reaction formula: $C+SO_2\rightarrow S+CO_2$. Further, the steam and $CO_2$ contained in the $SO_2$-containing gas and the $CO_2$ produced by burning of carbonaceous particles cause the following reactions to produce CO and $H_2$, and these substances react with the produced sulfur to thereby by-produce $H_2S$ and COS:

$C+CO_2\rightarrow 2CO$
$C+H_2O\rightarrow CO+H_2$
$2H_2+S_2\rightarrow 2H_2S$
$2CO+S_2\rightarrow 2COS$ Accordingly, a first gaseous mixture containing a vaporous sulfur, $H_2S$, COS and unreacted $SO_2$ flows in a line 5 from the $SO_2$ reduction reactor 4. This gaseous mixture is introduced into a first condenser 6 where said vaporous sulfur is separated by condensation. A second gaseous mixture obtained at this time is thence introduced into the Claus reactor 8 through a line 7 in order to further recover sulfur therefrom.

According to this embodiment, two Claus reactors are installed. The second gaseous mixture passed through the condenser 6 is introduced from the line 7 into a first Claus reactor 8 where $H_2S$ and $SO_2$ are converted into vaporous sulfur by the Claus reaction ($2H_2S+SO_2\rightarrow 3S+H_2O$), while COS is converted into $H_2S$ by the following hydrolysis reaction ($COS+H_2O\rightarrow H_2S+CO_2$) and this $H_2S$ is available for Claus reaction. The effluent gas from the first Claus reactor 8 is fed to a second condenser 9 where the vaporous sulfur is separated therefrom by condensation, and thereafter the residual gas containing $H_2S$, $SO_2$ and COS is introduced into a second Claus reactor 11 through a line 10. Within the second Claus reactor there also take place the same reactions as the first Claus reactor, and the vaporous sulfur-containing gas generated herein is supplied to a third condenser 12. In the condenser 12, the vaporous sulfur is separated by condensation, and the thus obtained residual gas is guided in a tail gas line 13 and treated for the purpose of ensuring environmental safety.

Although this embodiment has referred to the case where two Claus reactors are installed, it is to be noted that the number of Claus reactors used in the present invention may be one or three or more. However, in either case it will be preferable to maintain the temperature of inlet gas in the Claus reactor at a temperature suitable for the Claus reaction taking place in each reactor.

Figure 5:
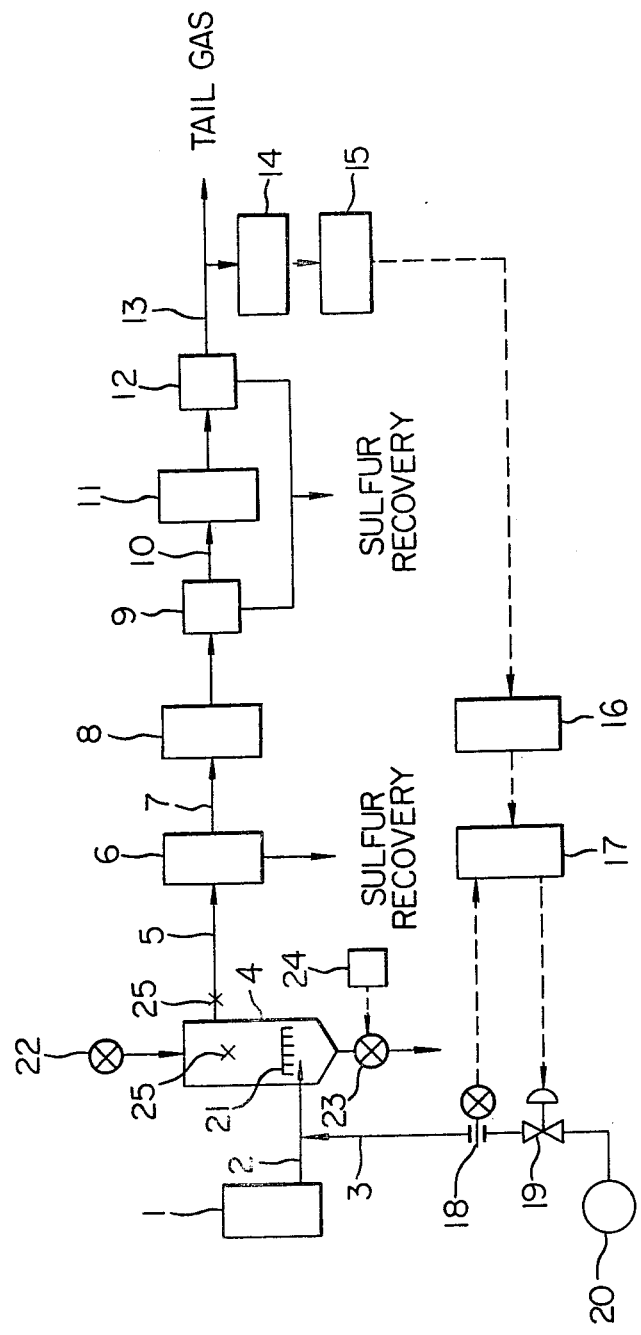

According to the process of the present invention, the Claus ratio of the second gaseous mixture flowing through the line 7 can be maintained at a level of about 2 by either of the following two control methods. That is, according to one control method utilizing the $SO_2$ conversion rate in a $SO_2$ reduction reactor, as shown in FIG. 4, the gas feed supplied to said $SO_2$ reduction reactor is sampled from a line 2 through a sampling line 26 by means of a sampling unit 27 for measuring its $SO_2$ concentration by means of a $SO_2$ analyzer 28. On the other hand, the outlet gas from the $SO_2$ reduction reactor is sampled likewise from a line 5 through a sampling line 29 by means of a sampling unit 30 for measuring its $SO_2$ concentration by means of a $SO_2$ analyzer 31. Each of thus measured $SO_2$ concentrations of inlet and outlet gases of the $SO_2$ reduction reactor is input to a Claus ratio controller 16 for calculating the $SO_2$ conversion rate and computing the air-feed amount required for maintaining the predetermined $SO_2$ conversion rate corresponding to a Claus ratio of 2. The thus obtained set point of the air amount is sent to an air flow rate controller 17. In order to regulate the air flow rate at the set point sent from the Claus ratio controller 16, the air flow rate controller 17 operates to regulate the amount of air supplied from an air supply apparatus 20 on the basis of the measured value sent from an air flow meter 18 by means of an air flow rate control valve 19. In this instance, it is preferable to preheat the air supplied from the air supply apparatus 20 to a temperature in the vicinity of the temperature of the $SO_2$-containing gas in the line 2. Another control method is based on the $SO_2$ concentration of a tail gas as shown in FIG. 5. According to this method, the sample gas sampled from a tail gas line 13 by means of a sampling unit 14 of a gas analyzer is introduced into a gas analyzer 15 where the $SO_2$ concentration of the tail gas is measured continuously. This measured value is sent to a Claus ratio controller 16 in the form of electric signals. The controller 16 computes the amount of oxygen to be supplied to the $SO_2$ reduction reactor 4 that is required for controlling, on the basis of the measured value obtained from the $SO_2$ gas analyzer 15, the $SO_2$ concentration in tail gas according to the set point of $SO_2$ concentration corresponding to the Claus ratio of 2, and sends the set point of the air amount to an air flow rate controller 17 in the form of electric signals. In order to regulate the air flow rate at the set point sent from the controller 16, the air flow rate controller 17 operates to regulate the amount of air supplied from an air supply apparatus 20 on the basis of the measured value sent from an air flow meter 18 by means of an air flow rate control valve 19. In this instance, it is preferable to preheat the air supplied from the air supply apparatus 20 to a temperature in the vicinity of the temperature of the $SO_2$-containing gas in the line 2.

In this connection, it is to be noted that in order to ensure the safe operation of the process according to the present invention, it is preferable to install, in the $SO_2$ reduction reactor 4 or line 5, thermometers 25 for monitoring abnormality in the reactor temperature together with a coal transport/discharge control apparatus 24 capable of changing the moving amount of coal when the reactor temperature is abnormal.

As is evident from the above explanation, the process according to the present invention resembles the processes disclosed in said Japanese Laid Open patent application No. 167107/1980 and now pending U.S. patent application Ser. No. 317382 in that the Claus ratio of outlet gas of the $SO_2$ reduction reactor may be maintained at a level of about 2 by regulating the amount of air supplied, but in the case of the process disclosed in the foregoing laid open patent application there is necessity of monitoring the temperature in the $SO_2$ reduction reactor and regulating the amount of air supplied so that the $SO_2$ reduction reaction may take place at a temperature in the range of 850°–950° C. As stated previously, however, it is difficult to control the temperature in the reactor in the range of 850°–950° C. by regulating the amount of air supplied because it is very troublesome to measure the temperature in the reactor and further the temperature in the reactor is under the control of various factors. On the other hand, the process disclosed in said U.S. Pat. No. 317,382 is troublesome in the absolute necessity of measuring both the $SO_2$ concentration and the $H_2S$ concentration. In contrast, the process according to the present invention is practical and profitable in that the Claus ratio of the gas coming from the $SO_2$ reduction reactor can be maintained at a level of about 2 by measuring the $SO_2$ conversion rate in the $SO_2$ reduction reactor or the $SO_2$ concentration of outlet gas from the final Claus reactor and regulating the amount of air supplied to the $SO_2$-containing gas according to the set point. Further, the $SO_2$ conversion rate or $SO_2$ concentration can be measured easily as compared with measurement of the reaction temperature in the $SO_2$ reduction reactor, and the gas analyzer used is not expensive as compared with the equipment required for measuring both the $SO_2$ concentration and the $H_2S$ concentration.

We claim:

1. In a process for producing sulfur from an $SO_2$-containing gas, comprising the steps of (a) mixing said $SO_2$-containing gas with oxygen or air to obtain a feed gas and then contacting said feed gas with carbonaceous particles, in a $SO_2$ reduction reactor, under conditions effective to convert $SO_2$ to sulfur to thereby produce a first gaseous reaction mixture containing vaporous sulfur, $H_2S$, COS and unreacted $SO_2$, (b) then condensing said vaporous sulfur and separating it from the first gaseous reaction mixture to thereby obtain a second gaseous mixture, (c) then introducing the second gaseous mixture into a Claus reactor under conditions effective to convert $H_2S$ and $SO_2$ to sulfur to thereby obtain a third gaseous mixture containing vaporous sulfur, (d) then condensing said vaporous sulfur and separating it from the third gaseous mixture to thereby obtain a fourth gaseous mixture having a reduced content of sulfur compounds, and (e) recovering the sulfur separated from said first and third gaseous mixtures, the improvement which comprises: measuring the conversion rate of converting $SO_2$ in said feed gas to sulfur in said $SO_2$ reduction reactor and regulating the amount of oxygen or air mixed with the $SO_2$-containing gas in response to said measured conversion rate so that said conversion rate in said $SO_2$ reduction reactor is maintained at a value in the range of from 75 to 85% and is effective to maintain the molar ratio of $H_2S/SO_2$ or $(H_2S+COS)/SO_2$ of said second gaseous mixture at a value of approximately 2.

2. A process as claimed in claim 1, wherein said step of measuring the conversion rate of converting $SO_2$ in said feed gas to sulfur in said $SO_2$ reduction reactor comprises sampling said feed gas and measuring the $SO_2$ concentration thereof, sampling said first gaseous reaction mixture and measuring the $SO_2$ concentration thereof, calculating said conversion rate in said $SO_2$ reduction reactor from the $SO_2$ concentrations indicated by the thus-obtained samples, and in which the amount of oxygen or air mixed with said $SO_2$-containing gas is regulated by operating valve means in response to said measured conversion rate.

3. A process according to claim 1 wherein said $SO_2$ reduction reactor is maintained at a temperature in the range of 800°–1000° C. and said Claus reactor is maintained at a temperature in the range of 200°–350° C.

4. A process according to claim 1 wherein said $SO_2$-containing gas feed is produced from an active carbon regenerator of a dry exhaust gas desulfurization plant.

5. In a process for producing sulfur from an $SO_2$-containing gas comprising the steps of (a) mixing said $SO_2$-containing gas with oxygen or air to obtain a feed gas and then contacting said feed gas with carbonaceous particles, in an $SO_2$ reduction reactor, under conditions effective to convert $SO_2$ to sulfur to thereby produce a first gaseous reaction mixture containing vaporous sulfur, $H_2S$, COS and unreacted $SO_2$, (b) then condensing said vaporous sulfur and separating it from the first gaseous reaction mixture to thereby obtain a second gaseous mixture, (c) then introducing the second gaseous mixture into a Claus reactor under conditions effective to convert $H_2S$ and $SO_2$ to sulfur to thereby produce a third gaseous mixture containing vaporous sulfur, (d) then condensing said vaporous sulfur and separating it from the third gaseous mixture to thereby obtain a fourth gaseous mixture having a reduced content of sulfur compounds, and (e) recovering the sulfur separated from the first and third gaseous mixtures, the improvement which comprises: measuring the $SO_2$ concentration in said fourth gaseous mixture and regulating the amount of oxygen or air mixed with the $SO_2$-containing gas in response to said measured $SO_2$ concentration in said fourth gaseous mixture so that the $SO_2$ concentration in said fourth gaseous mixture may be maintained at a predetermined value corresponding to a Claus ratio of 2 for maintaining the concentration ratio of $H_2S/SO_2$ or $(H_2S+COS)/SO_2$ of the second gaseous mixture at a value of approximately 2.

6. A process according to claim 5 wherein said $SO_2$ reduction reactor is maintained at a temperature in the range of 800°–1000° C. and said Claus reactor is maintained at a temperature in the range of 200°–350° C.

7. A process according to claim 5 wherein said $SO_2$-containing gas feed is produced from an active carbon regenerator of a dry exhaust gas desulfurization plant.

8. A process according to claim 5 wherein said Claus reactor comprises a plurality of individual reactors connected in series, sulfur is separated from the outlet gas of each reactor by condensation and recovered, and the $SO_2$ concentration in the outlet gas from the last reactor in said series is measured.

9. A process as claimed in claim 5, wherein said step of measuring the $SO_2$ concentration of said fourth gaseous mixture comprises sampling said fourth gaseous mixture, determining said $SO_2$ concentration of said fourth gaseous mixture by gas analysis thereof, and in which the amount of oxygen or air mixed with said $SO_2$-containing gas is regulated by operating valve means in response to said measured value of the $SO_2$ concentration of said fourth gaseous mixture.

10. A process as claimed in claim 5, wherein said $SO_2$ concentration in said mixture after said step (d) is about 0.4%.

* * * * *